US009198340B2

(12) United States Patent
Grollmes et al.

(10) Patent No.: US 9,198,340 B2
(45) Date of Patent: Dec. 1, 2015

(54) AGRICULTURAL IMPLEMENT MARKER FOLDABLE ABOUT COMPOUND ANGLE

(71) Applicants: Douglas J. Grollmes, Hesston, KS (US); William H. Thompson, Hesston, KS (US)

(72) Inventors: Douglas J. Grollmes, Hesston, KS (US); William H. Thompson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 149 days.

(21) Appl. No.: 13/959,791

(22) Filed: Aug. 6, 2013

(65) Prior Publication Data
US 2014/0041885 A1 Feb. 13, 2014

Related U.S. Application Data

(60) Provisional application No. 61/681,032, filed on Aug. 8, 2012.

(51) Int. Cl.
A01B 69/02 (2006.01)
A01B 63/14 (2006.01)
A01B 73/06 (2006.01)
A01B 73/04 (2006.01)

(52) U.S. Cl.
CPC ............ A01B 69/024 (2013.01); A01B 63/14 (2013.01); A01B 73/046 (2013.01); A01B 73/065 (2013.01)

(58) Field of Classification Search
CPC .. A01B 69/024; A01B 73/046; A01B 73/065; A01B 63/14

USPC .......................................... 172/126, 311, 456
See application file for complete search history.

(56) References Cited

U.S. PATENT DOCUMENTS

| 4,011,914 | A | * | 3/1977 | Elmer | 172/126 |
|---|---|---|---|---|---|
| 4,207,950 | A | * | 6/1980 | Kinzenbaw | 172/126 |
| 4,449,590 | A | * | 5/1984 | Williamson | 172/126 |
| 4,986,367 | A | * | 1/1991 | Kinzenbaw | 172/126 |
| 5,485,796 | A | * | 1/1996 | Bassett | 111/33 |
| 5,542,190 | A | * | 8/1996 | Wahls | 33/624 |
| 5,573,070 | A | * | 11/1996 | Meek et al. | 172/131 |
| 5,785,128 | A | * | 7/1998 | Redekop | 172/126 |
| 6,257,343 | B1 | * | 7/2001 | Maenle et al. | 172/126 |
| 6,883,436 | B2 | * | 4/2005 | Fuerst | 104/7.3 |
| 8,567,518 | B2 | * | 10/2013 | Arnold et al. | 172/311 |
| 2005/0087350 | A1 | * | 4/2005 | Bauer | 172/311 |
| 2009/0020298 | A1 | * | 1/2009 | Harnetiaux et al. | 172/1 |
| 2010/0200252 | A1 | * | 8/2010 | Naylor et al. | 172/1 |

* cited by examiner

Primary Examiner — Robert Pezzuto
Assistant Examiner — Jessica H Lutz

(57) ABSTRACT

A foldable marker mounted to an agricultural implement includes pivotally connected inboard and outboard arms, with the outboard arm supporting a ground marker device. The arms are shiftable between folded and unfolded conditions, with the inboard arm defining a longitudinal axis extending along the length of the inboard arm and a transverse axis orthogonal to the longitudinal axis, with the inboard arm operable to be unfolded so that the transverse axis is substantially aligned with a forward direction in the unfolded condition. A pivot joint defines a pivot axis, with the pivot axis and transverse axis defining a lateral angle of at least twenty degrees and a vertical angle of at least twenty degrees. The outboard arm is in a laterally extended position when the arms are in the unfolded condition and in a laterally retracted position when the arms are in the folded condition.

8 Claims, 9 Drawing Sheets

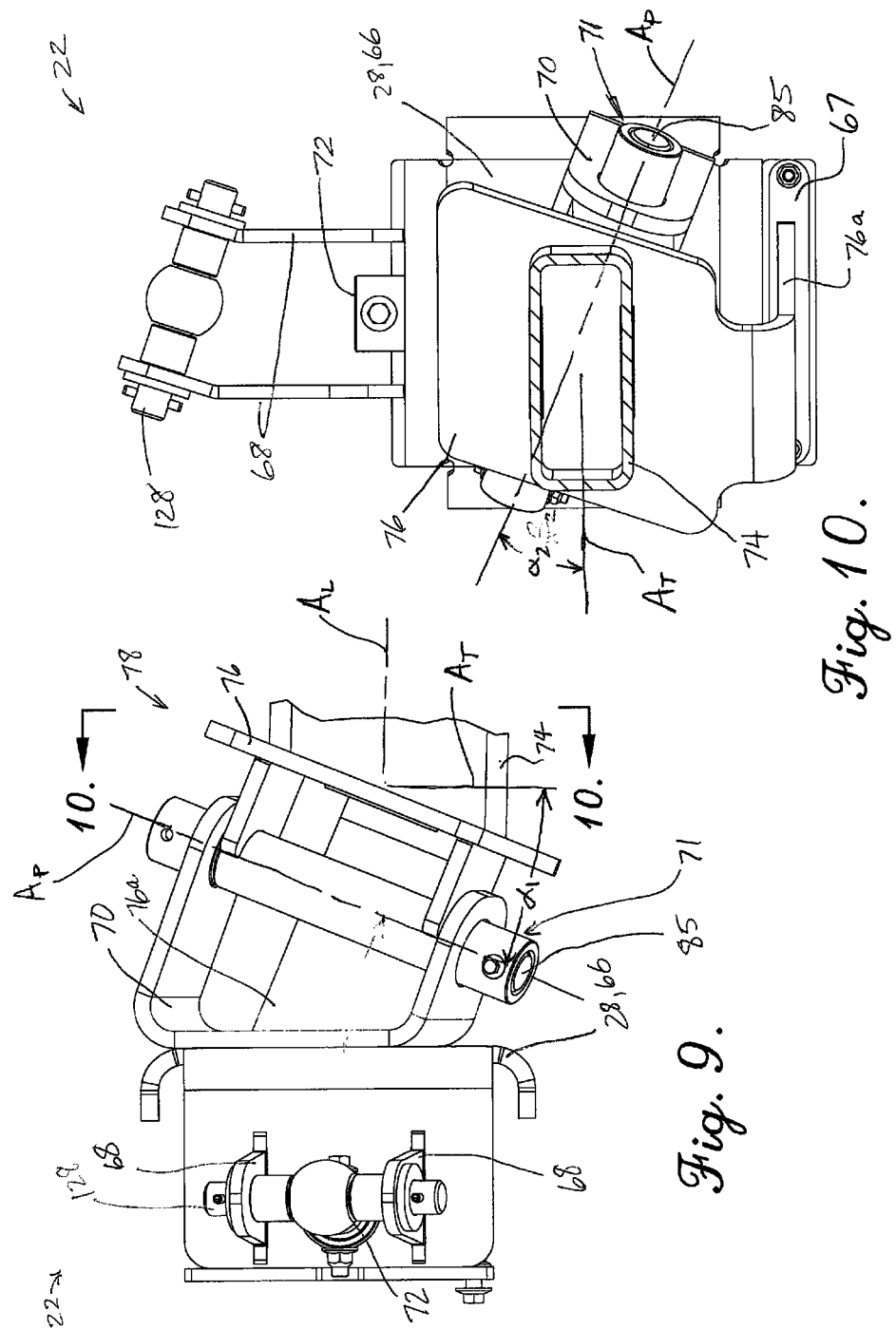

AGRICULTURAL IMPLEMENT MARKER FOLDABLE ABOUT COMPOUND ANGLE

CROSS REFERENCE TO RELATED APPLICATION

This application claims the benefit of U.S. Provisional Application No. 61/681,032 entitled AGRICULTURAL IMPLEMENT MARKER FOLDABLE ABOUT COMPOUND ANGLE, filed Aug. 8, 2012, which is hereby incorporated by reference in its entirety.

BACKGROUND OF THE INVENTION

1. Field of Invention

The present invention relates generally to agricultural implements. More particularly, embodiments of the present invention concern a foldable marker for an agricultural implement.

2. Description of Related Art

It is well known in the art that some agricultural implements, such as planters and drills, need to be moved precisely along a field. For instance, when an operator is planting the field and/or applying fertilizer to the field, it is desirable to completely cover a predetermined area of the field by making multiple passes across the field with the implement. In making such planting and/or fertilization passes, the operator will generally prefer to minimize overlapping coverage by adjacent passes. By minimizing overlapping of adjacent passes, the operator will generally minimize seed and/or fertilizer waste, reduce planting and/or fertilization time, and reduce associated operation costs.

Thus, to provide suitable planting efficiency, prior art implements have long included a shiftable marker with a coulter disc. In the conventional form, the marker is selectively shifted to extend laterally from the implement so that the coulter disc cuts into the ground at a location spaced laterally from the implement. Thus, as the implement makes a pass along the field, the disc cuts a trench in the field parallel to the pass. In the usual manner, the trench serves as visual indicia for the operator to follow and align the implement during the next adjacent pass. When field operations are completed, the marker may be retracted from its extended (or unfolded) condition so that the implement can be transported.

However, prior art markers for agricultural implements suffer from certain undesirable limitations. For example, conventional markers do not generally fold into a compact position adjacent to the rest of the implement. For conventional markers with multiple folding joints, such markers have a complicated construction with multiple powered actuators to fold and unfold the marker. Consequently, these markers are generally prone to failure and expensive to manufacture.

OVERVIEW OF THE INVENTION

In one embodiment, a foldable marker is operable to be mounted to an agricultural implement and moved with the implement in a forward direction. The foldable marker broadly includes inboard and outboard arms. The inboard and outboard arms are pivotally connected to one another. The inboard arm is pivotally mounted at a pivot joint, with the outboard arm being operable to support a ground marker device. The inboard and outboard arms are shiftable between folded and unfolded conditions, with the inboard arm defining a longitudinal axis that extends along the length of the inboard arm and a transverse axis orthogonal to the longitudinal axis, with the inboard arm operable to be unfolded so that the transverse axis is substantially aligned with the forward direction in the unfolded condition. The pivot joint defines a pivot axis, with the pivot axis and transverse axis defining a lateral angle of at least about twenty (20) degrees and a vertical angle of at least about twenty (20) degrees. The outboard arm is in a laterally extended position when the arms are in the unfolded condition. The outboard arm is in a laterally retracted position when the arms are in the folded condition, with the positions being spaced from one another along a lateral direction transverse to the axes of the arms. The single powered cylinder assembly is attached relative to the arms to drive the arms between the folded and unfolded conditions.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 9 is a fragmentary top view of the left side foldable marker shown in FIGS. 1-8, showing the pivot joint that connects the support frame and inboard arm of the marker; and FIG. 10 is a cross section of the left side foldable marker taken along line 10-10 in FIG. 9.

Figure 1:
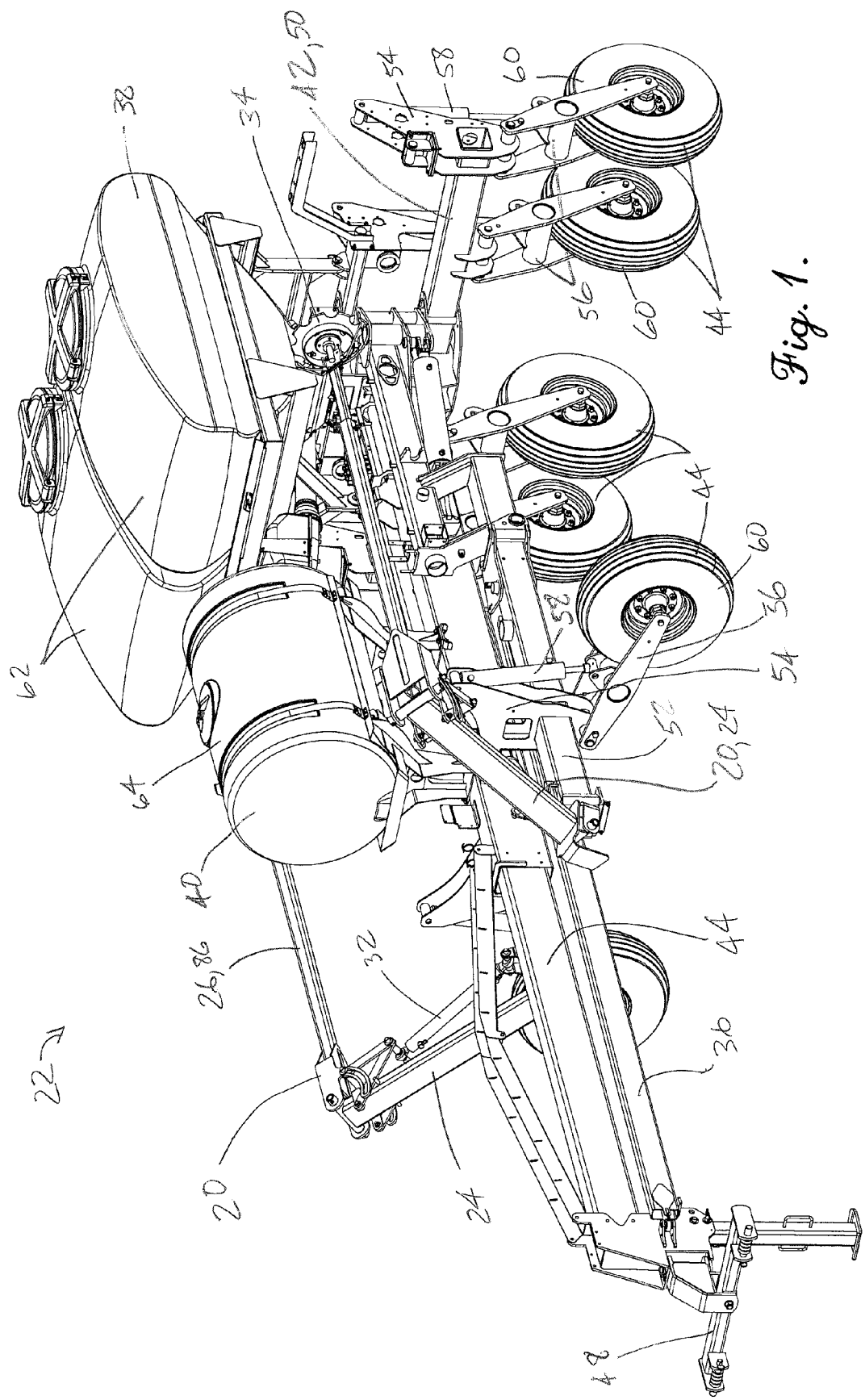
FIG. 1 is a fragmentary perspective of a multi-row planter that includes left side and right side foldable markers constructed in accordance with a preferred embodiment of the present invention, with the planter further including a rolling chassis, a seed system, and a fertilizer system, and showing the planter in a transport configuration where the chassis is in a folded chassis position and the foldable markers are in a folded arm condition.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 2:
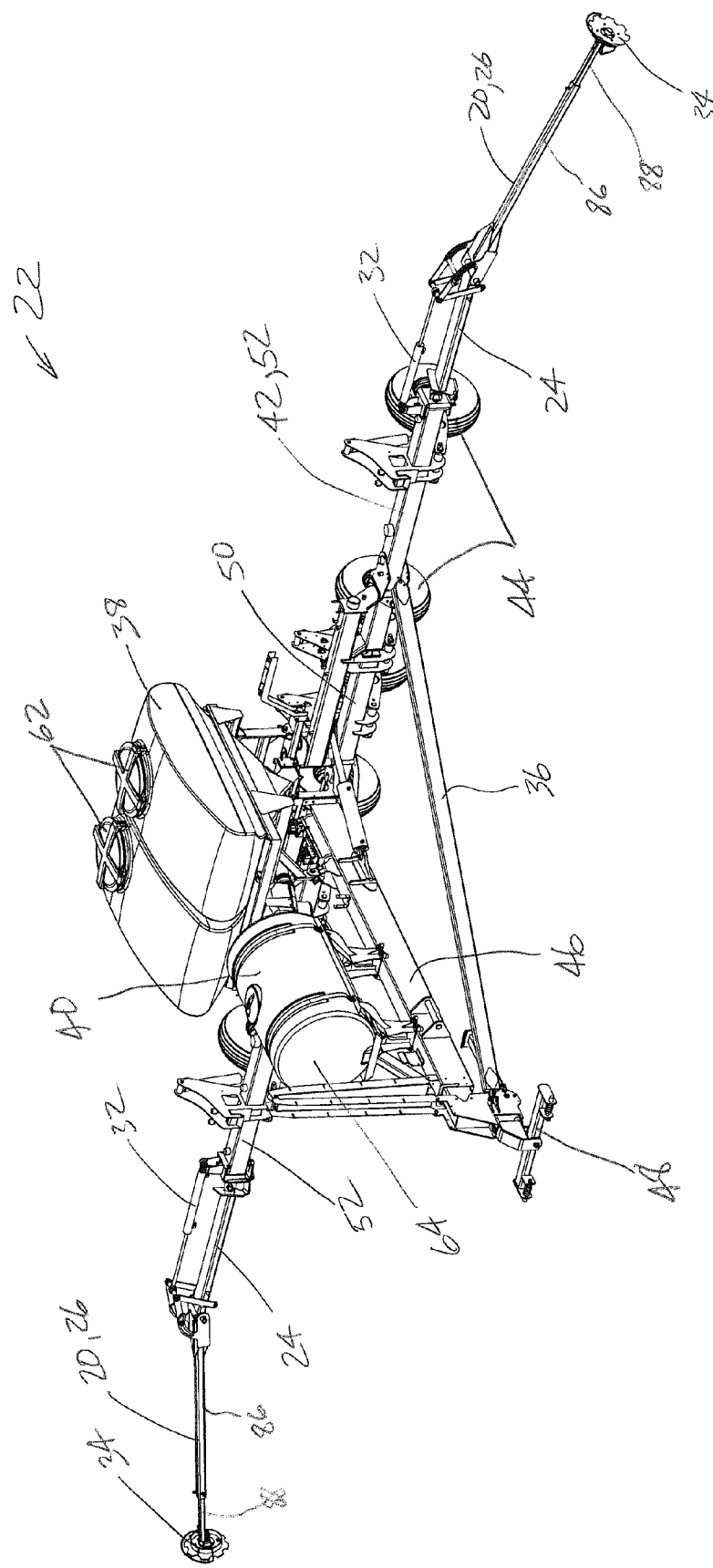
FIG. 2 is a fragmentary perspective of the multi-row planter similar to FIG. 1, but showing the planter in a planting configuration where the chassis is in an unfolded chassis position and the foldable markers are in an unfolded arm condition.
Figure 3:
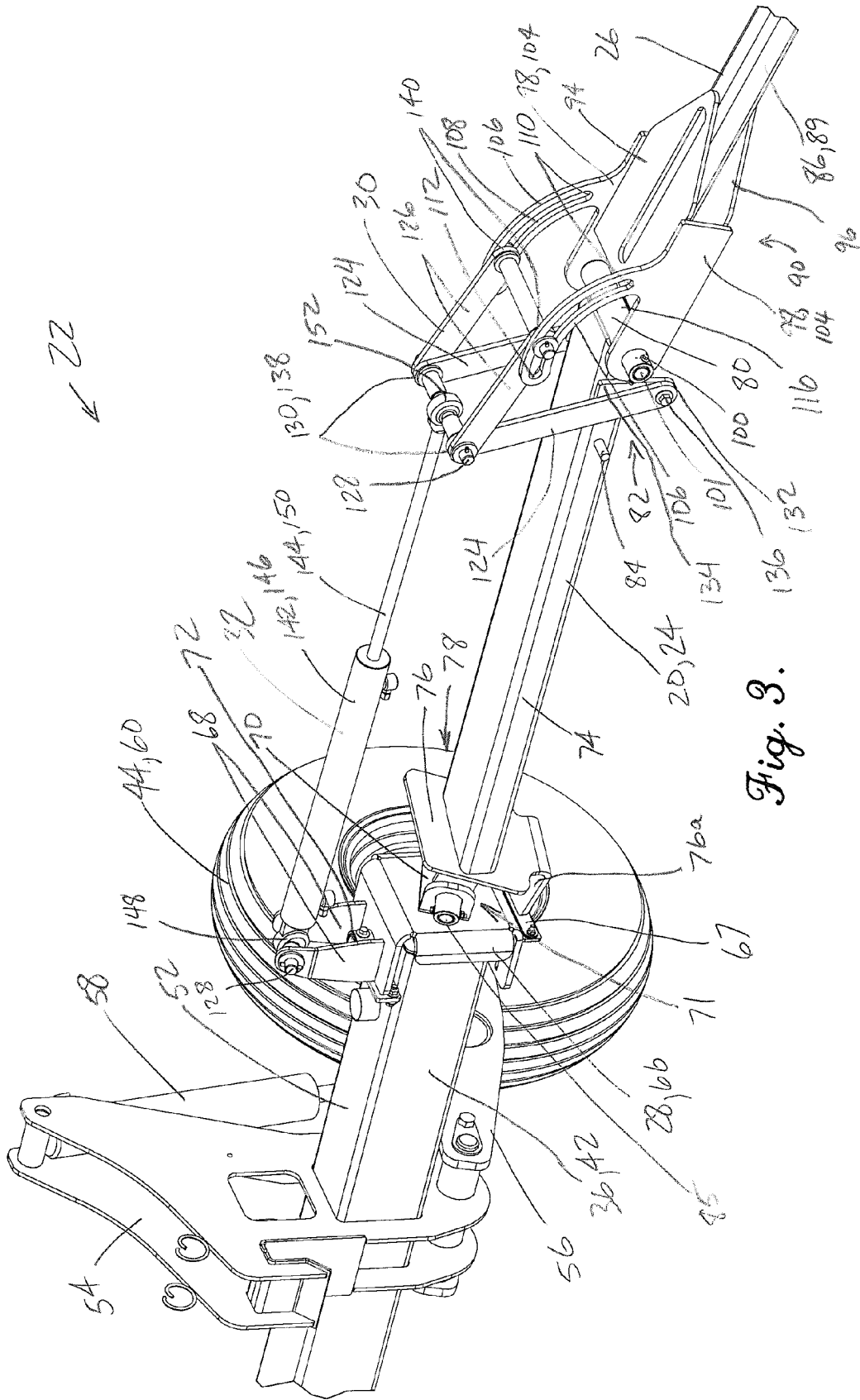
FIG. 3 is an enlarged fragmentary perspective of the multi-row planter shown in FIGS. 1 and 2, showing a support frame, inboard and outboard arms, a hydraulic cylinder assembly, and a linkage assembly of the left side foldable marker, with the support frame being mounted on the chassis, and showing the chassis in the unfolded chassis position and the left side foldable marker in the unfolded arm condition.

Turning initially to FIGS. 1 and 2, foldable markers 20 are constructed in accordance with a preferred embodiment of the present invention and are illustrated in use as part of an agricultural implement 22. The illustrated implement 22 is preferably a multi-row planter with twelve (12) rows and thirty-eight (38) inch spacing between the rows. However, it is also within the ambit of the present invention where the markers 20 are used with other implements to provide visual indicia for guiding the operator along a field (not shown). As will be discussed further, the implement 22 is shiftable between a transport configuration (see FIG. 1) and a planting configuration (see FIG. 2).

The illustrated foldable markers 20 preferably comprise left side and right side markers 20 that are mirror images of one another and are otherwise preferably substantially identical to each other. For the sake of brevity, description of the left side foldable marker 20 will be provided, with the understanding that the markers 20 have similar components. Thus, each foldable marker 20 broadly includes inboard and outboard arms 24, 26, a support frame 28, a linkage assembly 30, a hydraulic cylinder assembly 32, and a coulter assembly 34.

In the usual manner, the implement 22 is designed to be towed by a powered tractor (not shown) along the field to plant seed and/or to apply fertilizer in the usual manner. The illustrated implement 22 includes, among other things, a rolling chassis 36, a seed supply system 38, fertilizer system 40, and a pair of foldable markers 20.

The rolling chassis 36 preferably includes a toolbar assembly 42, adjustable wheel assemblies 44, a tow bar 46, a hitch 48. The toolbar assembly 42 includes a center section 50 and wing sections 52 pivotally attached to the center section 50. Each of the wing sections 52 can be pivoted relative to the center section 50 between a folded chassis position associated with the transport configuration (see FIG. 1), where the implement 22 is operable to be transported along a road, and an unfolded chassis position associated with the planting configuration (see FIG. 2), where the implement 22 is operable to be pulled along a field to plant a crop and/or apply fertilizer.

Turning to FIGS. 1-7, the wheel assemblies 44 each include a fixed frame 54, a swingable frame 56, a hydraulic cylinder assembly 58, and a wheel 60. The fixed frame 54 is elongated to present upper and lower ends and is mounted to a corresponding one of the sections 50, 52. The swingable frame 56 is elongated and presents proximal and distal ends. The proximal end of swingable frame 56 is rotatably mounted to the lower end of the fixed frame 54. The hydraulic cylinder assembly 58 is conventional, with a cylinder of the assembly 58 being attached to the upper end of the fixed frame 54 and a piston of the cylinder being attached to the swingable frame 56 between the proximal and distal ends. The wheel 60 is rotatably mounted to the swingable frame 56 at the distal end thereof. The wheel assemblies 44 are operably connected to one another and to a hydraulic power system (not shown) to control and selectively adjust the height of the rolling chassis 36.

The seed supply system 38 is conventional and includes, among other things, bulk seed containers 62, a plurality of openers (not shown) mounted to the toolbar assembly 42, and tubing (not shown) to transmit seed from the containers 62 to the openers. The fertilizer system 40 is also conventional and includes fertilizer tank 64 and lines (not shown) to transmit fertilizer from the tank 64 to locations adjacent the openers. In the usual manner, the seed supply system 38 and fertilizer system 40 can each be used separately or simultaneously to plant seed and/or apply fertilizer to the field.

Turning to FIGS. 3-6, the support frame 28 includes a central bracket 66. The bracket 66 includes a lower stop 67, a pair of upper tabs 68, and a support bracket 70. The upper tabs 68 are attached to one end of the cylinder assembly 32, as will be discussed. The support bracket 70 is attached to the inboard arm 24 to form a pivot joint 71. As will be discussed, the pivot joint 71 is preferably configured to provide compact folding of the marker 20. The support frame 28 is removably attached to the outboard end of the wing section 52 with a pin 72.

The inboard arm 24 is preferably unitary and substantially rigid. The inboard arm 24 preferably includes a tubular body 74, an arm pivot bracket 76 integrally fixed to an inboard end 78 of the body 74, and a sleeve 80 integrally fixed to an outboard end 82 of the body 74. The inboard arm 24 also includes stops 84 fixed to opposite sides of the tubular body 74. The inboard arm 24 is elongated and defines a longitudinal axis $A_L$ along its length and a transverse axis $A_T$ that is orthogonal to the longitudinal axis $A_L$ (see FIGS. 9 and 10).

Preferably, the support frame 28 is attached to the wing section 52 of the toolbar assembly 42. It has been found that attachment of the foldable marker 20 directly to the toolbar provides suitable support for the foldable marker 20. The support frame 28 is preferably attached to the wing section 52 so that the longitudinal axis AL is substantially parallel to the longitudinal axis of the wing section 52 when the marker 20 is unfolded. More preferably, the longitudinal axis $A_L$ is substantially coaxially aligned with the longitudinal axis of the wing section 52 along the fore-and-aft direction of the implement when the marker 20 is unfolded. However, for some aspects of the present invention, the wing section 52 and inboard arm 24 could be alternatively positioned when attached to one another.

Again, the inboard arm 24 is pivotally attached to the support bracket 70 with a pin 85 to form the pivot joint 71. The pivot joint 71 defines a pivot axis $A_P$ (see FIGS. 9 and 10). Preferably, the pivot axis $A_P$ and the transverse axis $A_T$ define a lateral angle $\alpha 1$ and a vertical angle $\alpha 2$. The angles $\alpha 1$, $\alpha 2$ each preferably range from about ten (10) degrees to about thirty (30) degrees and, more preferably, are about twenty (20) degrees. The arm pivot bracket 76 preferably includes a tab 76a that engages the lower stop 67 of the central bracket 66 to restrict downward pivotal movement of the inboard arm from an unfolded position (see FIG. 4).

The outboard arm 26 preferably includes telescopic inboard and outboard arm sections 86, 88. The inboard arm section 86 includes a tubular body 89 that presents inboard and outboard ends 90, 92 and an opening that extends continuously between the ends 90, 92. The inboard arm section 86 also includes upper and lower plates 94, 96 fixed to the inboard end 90 of the tubular body 89, slotted plates 98 fixed to the upper and lower plates 94, 96, bushings 100 fixed to the slotted plates 98, and a pin 101. The inboard arm section 86 further includes arm adjusting fasteners 102 attached to the outboard end 92 of the tubular body 89.

Each slotted plate 98 preferably includes an elongated base 104 that extends generally along the axis of the tubular body 89. The plate 98 also includes a curved projection 106 that is fixed to and projects from a location between the ends of the base 104 both upwardly and in an inboard direction when the arms 24, 26 are unfolded. Each projection 106 presents an elongated slot 108 that extends from a slot end 110 adjacent the base 104 and extends generally upwardly and along the inboard direction to slot end 112 (see FIG. 4). While the slots 108 are preferred for connecting the linkage assembly 30 to the outboard arm 26, the principles of the present invention are applicable where the inboard arm section 86 has a different form to permit interconnection with the linkage assembly 30.

The outboard arm section 88 is preferably unitary and includes an elongated tubular body that presents an inboard end (not shown) and an outboard end 114. In the illustrated embodiment, the outboard arm section 88 is preferably telescopically mounted within the inboard arm section 86 by inserting the inboard end of the outboard arm section 88 into the opening at the outboard end 92 of the inboard arm section 86. The fasteners 102 are preferably used to selectively secure the arm sections 86, 88 relative to one another to define a lateral length of the marker 20. While the illustrated telescopic construction of the arm sections 86, 88 is preferred, the principles of the present invention are equally applicable where the arm sections 86, 88 have an alternative slidable interconnection structure. Furthermore, the arm sections 86, 88 could be interconnected by means other than a sliding connection. For instance, the arm sections 86, 88 could be pivotally connected to each other. Yet further, the outboard arm 26 could alternatively have a fixed length.

The outboard arm 26 is preferably pivotally attached to the inboard arm 24 by aligning the bushings 100 with sleeve 30 and securing the pin 101 through the sleeve 30 and bushings 100. Thus, the illustrated sleeve 30, bushings 100, and pin 101 cooperatively form a pivot joint 116 between the arms 24, 26.

The coulter assembly 34 is preferably used to mark the ground and includes a coulter disc 118, a rotatable hub 120, and a disc guard 122. The rotatable hub 120 is rotatably mounted adjacent the outboard end 114 of the outboard arm section 88, with the hub axis extending along and generally parallel to the axis of the outboard arm section 88. The coulter disc 118 is removably attached to the rotatable hub 120 so that the coulter disc 118 is operable to rotate relative to the outboard arm section 88. The disc guard 122 comprises an elongated rod that is shaped to present an outermost curved section. The disc guard 122 is attached to the outboard arm section 88 so that the curved section extends along an above-ground portion of the cutting edge of the coulter disc 118.

The coulter assembly 34 is supported by the arms 24, 26 and is constructed so that the coulter disc 118 engages the ground as the marker 20 is moved as part of the implement 22. As the coulter disc 118 rotates and follows the ground, a lower portion of the coulter cutting edge cuts into the ground, leaving a visible demarcation in the field.

Turning to FIGS. 3-8, the linkage assembly 30 is preferably operable to interconnect the arms 24, 26 so that the marker 20 can be shifted between folded and unfolded arm conditions. Such movement is most preferably accomplished with the single illustrated cylinder assembly 32. In the illustrated embodiment, the folded arm condition is preferably associated with the transport configuration of the implement 22, and the unfolded arm condition is preferably associated with the planting configuration of the implement 22. However, it is within the scope of the present invention where at least one of the foldable markers 20 is in the folded arm condition when the implement 22 is being used to plant a crop and/or apply fertilizer. That is, the implement 22 can be in a planting configuration while one or both of the foldable markers 20 is in the folded condition.

Figure 4:
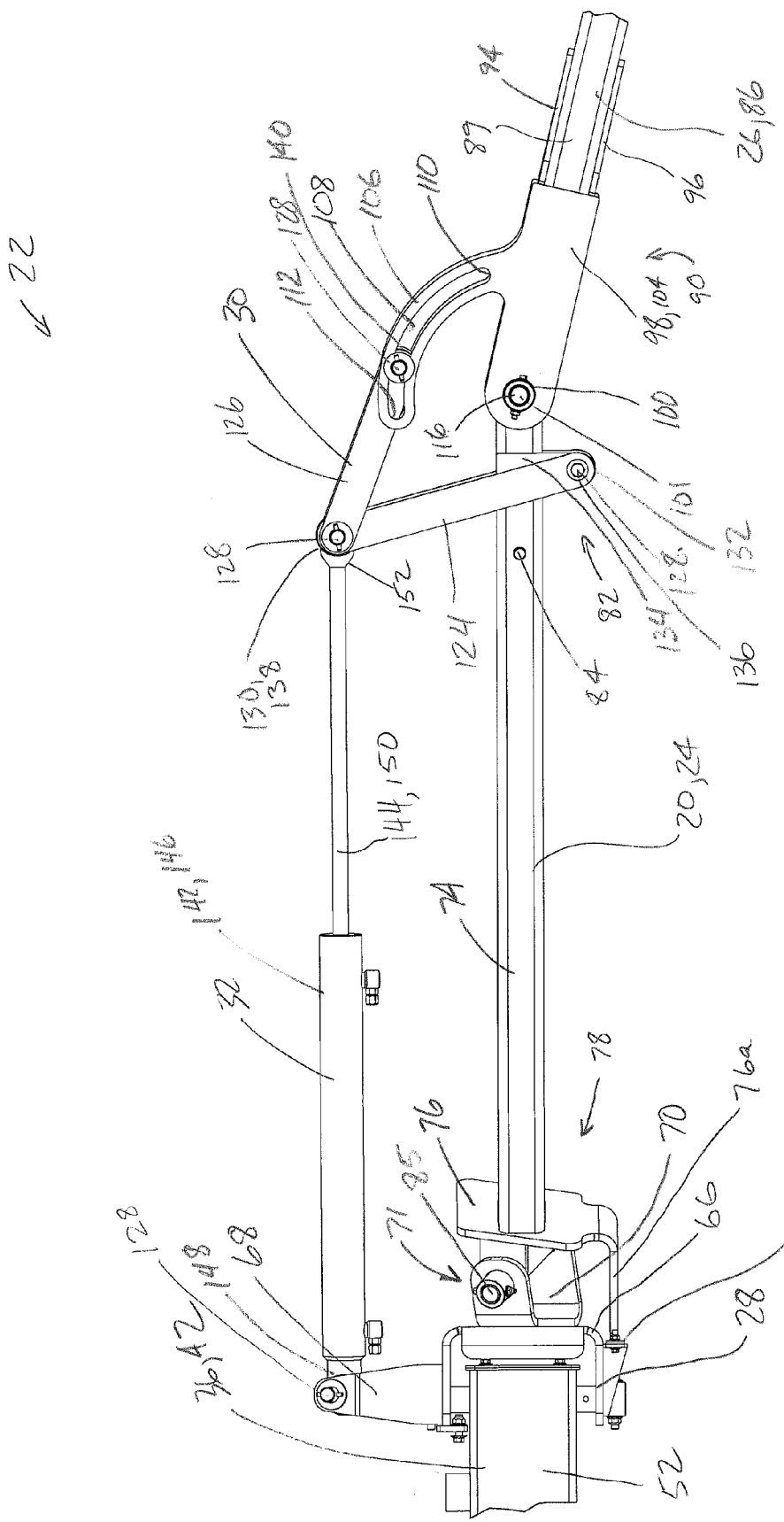
FIG. 4 is an enlarged fragmentary front elevation of the multi-row planter shown in FIGS. 1-3, showing the chassis in the unfolded chassis position and the left side foldable marker in the unfolded arm condition.
Figure 5:
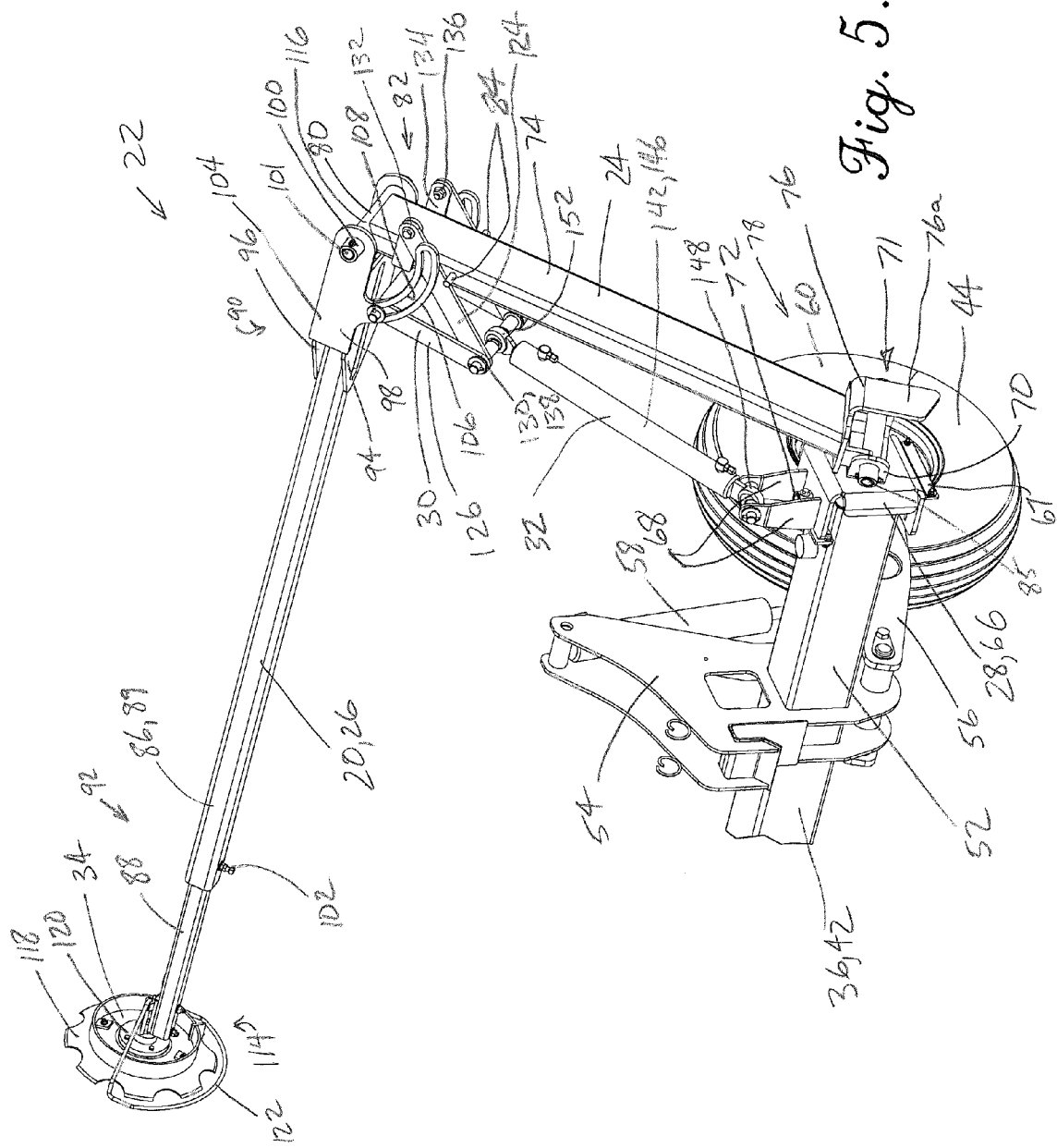
FIG. 5 is an enlarged fragmentary perspective of the multi-row planter shown in FIGS. 1-4, showing the chassis in the unfolded chassis position and the left side foldable marker in a folded arm condition, and showing telescopic sections of the outboard arm, as well as a coulter assembly mounted on an outboard end of the outboard arm.
Figure 6:
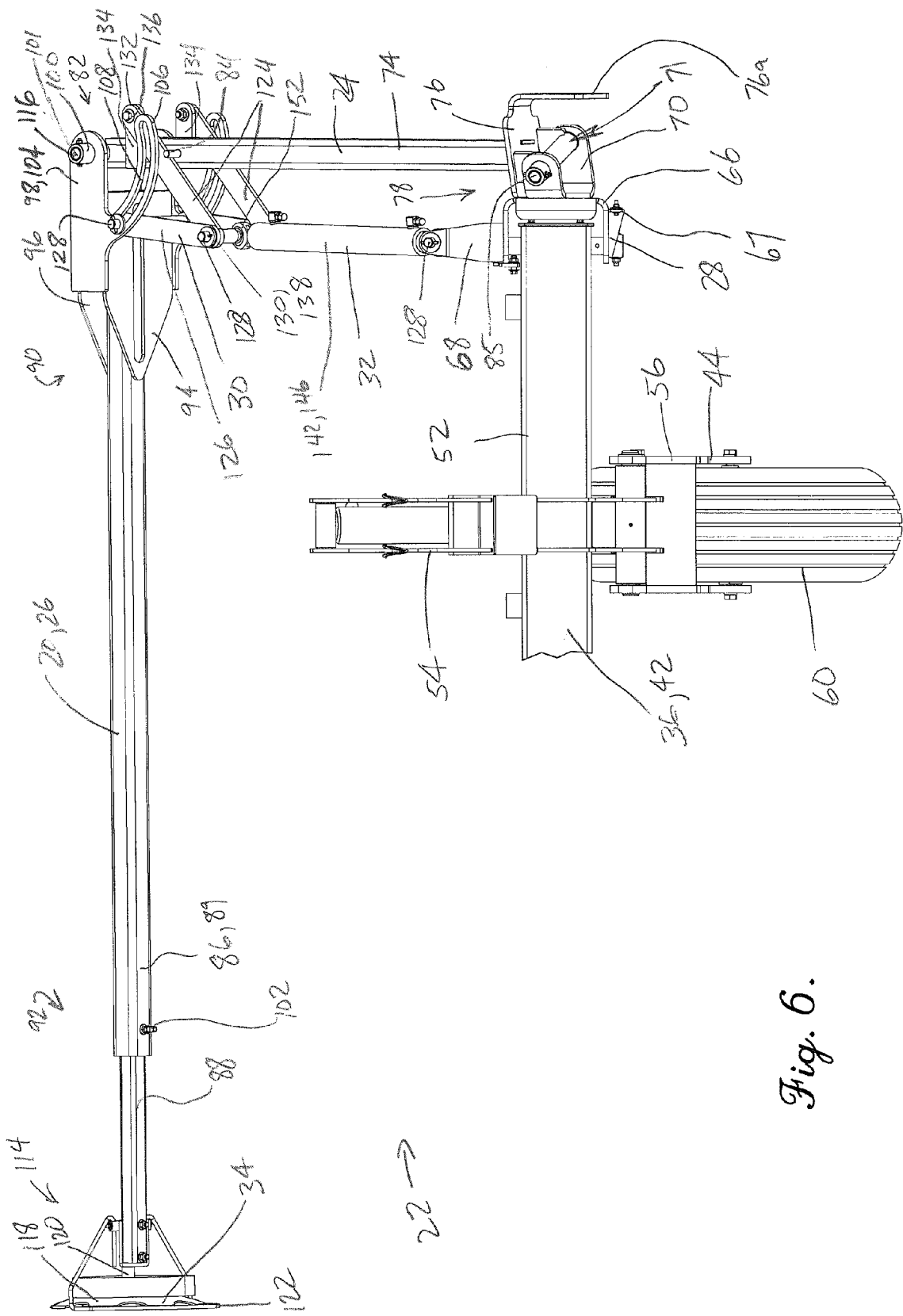
FIG. 6 is an enlarged fragmentary front elevation of the multi-row planter shown in FIGS. 1-5, showing the chassis in the unfolded chassis position and the left side foldable marker in the folded arm condition.
Figure 7:
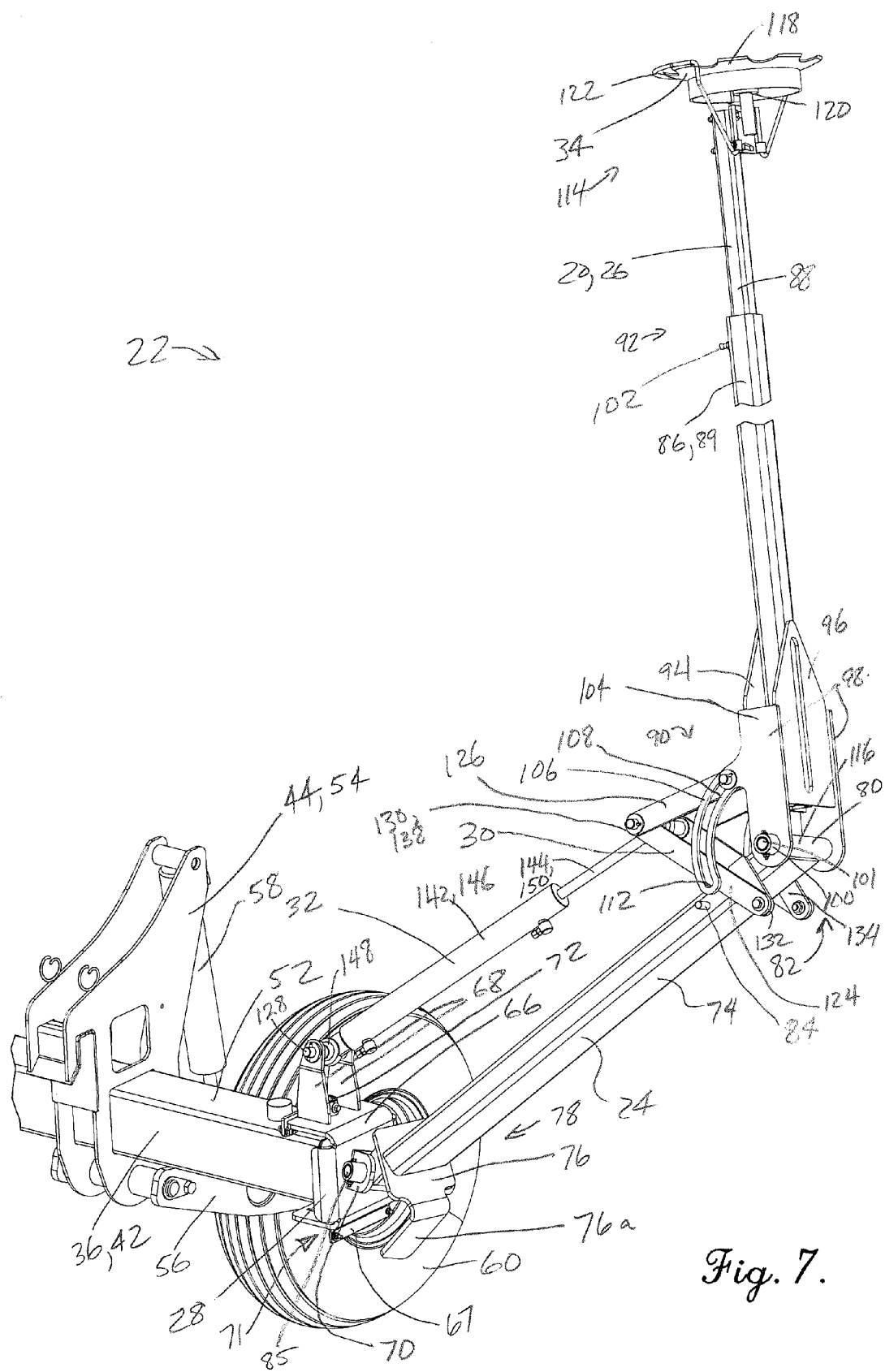
FIG. 7 is an enlarged fragmentary perspective of the multi-row planter similar to FIG. 5, but showing the left side foldable marker shifted to an intermediate position between the folded and unfolded arm conditions.
Figure 8:
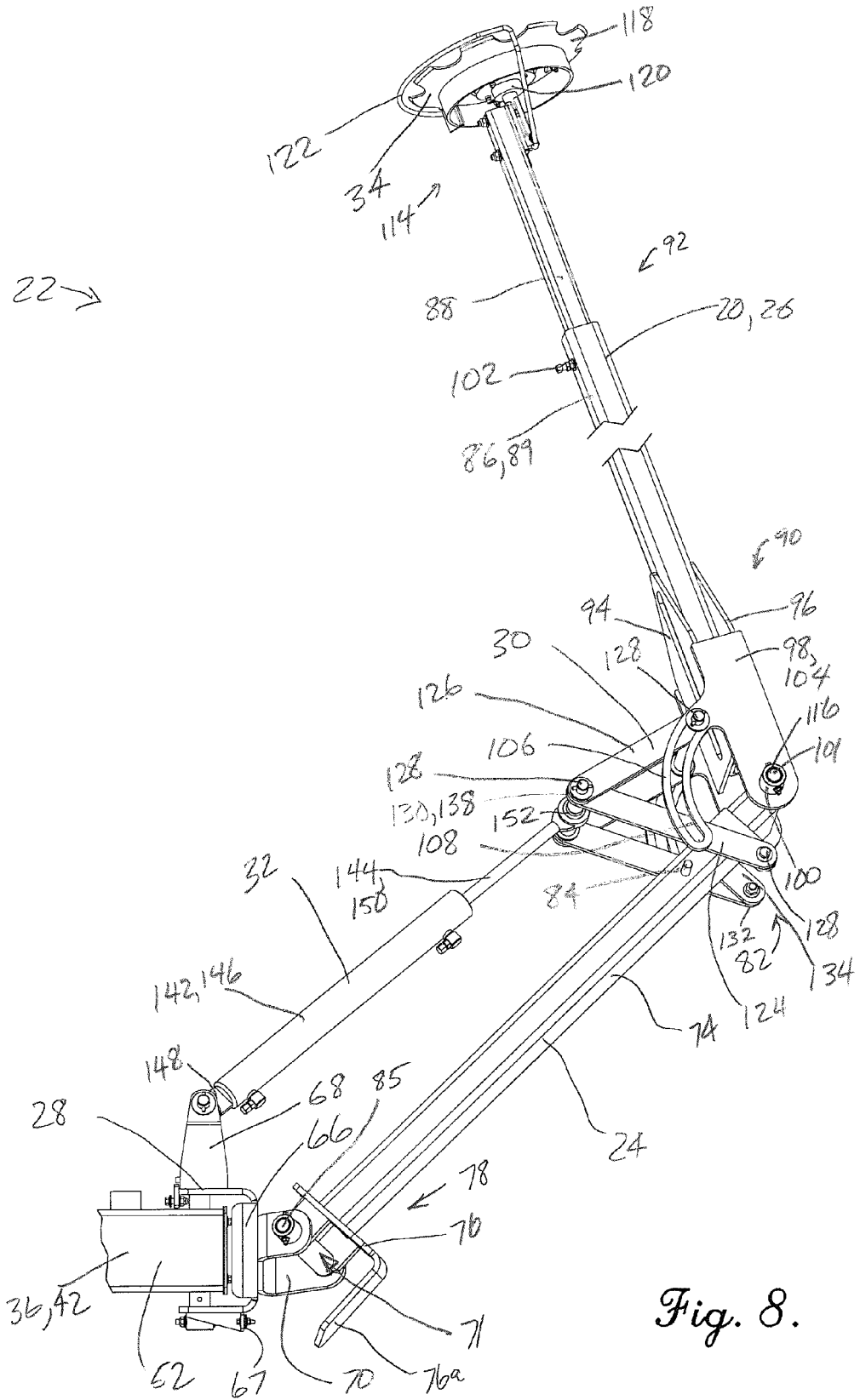
FIG. 8 is an enlarged fragmentary front elevation of the multi-row planter similar to FIG. 6, but showing the left side foldable marker shifted to the intermediate position between the folded and unfolded arm conditions.

The illustrated linkage assembly 30 preferably includes base links 124, sliding links 126, and link pins 128 (see FIG. 4). The base links 124 are each preferably elongated and present opposite upper and lower ends 130, 132. Each base link 124 is pivotally attached a corresponding tab 134 of the inboard arm 24 at the lower end 132 to form a pivot joint 136, with the base link 124 generally projecting upwardly from the pivot joint 136.

The sliding links 126 are each preferably elongated and present opposite inboard and outboard ends 138, 140 (see FIG. 4). The inboard end 138 of each sliding link 126 is pivotally attached to the upper end 130 of a corresponding base link 124 with one of the link pins 128. Each sliding link 126 extends in a generally outboard direction toward the outboard end 140. The outboard end 140 is attached to the projection 106 with another link pin 128, with the link pin 128 being slidably mounted within slots 108. Thus, the link pin 128 preferably constrains movement of the outboard ends 140 of sliding links 126 to movement along the slots 108. As will be discussed, the illustrated linkage assembly 30 preferably cooperates with the arms 24, 26 to control arm movement between the folded and unfolded arm conditions.

The cylinder assembly 32 comprises a conventional double-acting hydraulic cylinder that is fluidly connected to and powered by a hydraulic power system (not shown). As one of ordinary skill will appreciate, the double-acting cylinder can be selectively powered by a user to any location within a range of cylinder lengths. The conventional cylinder assembly 32 preferably includes a hydraulic cylinder 142 and a piston 144 slidably received by the cylinder 142. The cylinder 142 includes a cylinder body 146 and a coupling end 148 that preferably includes a ball coupling. The coupling end 148 is pivotally mounted to the tabs 134 with a pin. The piston 144 includes a piston body 150 and a coupling end 152 that includes a ball coupling. The coupling end 150 is pivotally mounted to link pin. Thus, piston movement along the piston axis causes corresponding movement of the linkage assembly 30 relative to the support frame 28.

Turning to FIGS. 3-8, the marker 20 is shiftable from the unfolded arm condition to the folded arm condition by shifting the cylinder assembly 32 from an extended position to a retracted position. As the piston 144 retracts, the link pin 128, the upper end 130 of base link 124, and the inboard end 138 of sliding link 126 move with the piston 144. Generally, piston retraction from the unfolded arm condition causes the link pin 128 to slide toward the slot end 112. Once the link pin 128 engages the slot end 112, further piston retraction generally causes pivoting of the outboard arm 26 relative to the inboard arm 24, until the base links 124 engage the stops 84. Piston retraction also causes pivoting of the inboard arm 24 relative to the support frame 28 until the inboard arm 24 is in an upright position (see FIGS. 5 and 6).

With the inboard arm 24 in the upright position, the outboard link pin 128 attached to the outboard end of the sliding link 126 pivots the outboard arm 26 to a location relative to the pivot joint 116 (see FIGS. 5 and 6) so that gravity urges the outboard arm 26 to continue further pivoting in the folding direction until the slot end 110 engages the outboard link pin 128.

Generally, the inboard and outboard arms 24, 26 move at the same time during at least part of the marker folding process. However, the marker 20 could be configured so that only one of the arms 24,26 moves entirely from the unfolded condition to the folded condition and then the other arm 24,26 moves from the unfolded condition to the folded condition.

In the folded arm condition, the inboard arm 24 projects upwardly and in the outboard direction from the pivot joint 71 when the wing section 52 is in the folded position (see FIG. 1). Also, the outboard arm 26 projects generally rearwardly from the pivot joint 116. Thus, the configuration of the foldable marker 20 allows the outboard arm 26 to be shifted into the folded condition without interference from the fertilizer tank 64 or other structure adjacent thereto when the wing section 52 is in the folded position (see FIG. 1).

The foldable marker 20 is shiftable from the folded arm condition to the unfolded arm condition by shifting the cylinder assembly 32 from the retracted position to the extended position. As the piston 144 extends, the link pin 128, the upper end 130 of base link 124, and the inboard end 138 of sliding link 126 generally move with the piston 144. Piston extension from the folded arm condition causes the arms 24, 26 to pivot downwardly relative to the support frame 28. The inboard arm 24 pivots downwardly until the inboard arm 24 is generally horizontal (see FIGS. 3 and 4). In particular, the tab 76a engages the lower stop 67 to restrict further downward movement of the inboard arm 24.

Piston extension also causes pivotal movement of the outboard arm 26 relative to the inboard arm 24. As the sliding link 126 extends with the piston 144, the outboard link pin 128 attached to the outboard end of the sliding link 126 engages the slot end 110 and pivots the outboard arm 26 relative to the inboard arm 24. With the inboard arm 24 in the horizontal position, the outboard link pin 128 pivots the outboard arm 26 to a location relative to the pivot joint 116 (see FIG. 4) so that gravity urges the outboard arm 26 to continue further pivoting in the downward direction until the coulter assembly 34 engages the ground and restricts further downward movement.

Generally, the inboard and outboard arms 24, 26 move at the same time during at least part of the marker unfolding process. However, the marker 20 could be configured so that only one of the arms 24,26 moves entirely from the folded condition to the unfolded condition and then the other arm 24,26 moves from the folded condition to the unfolded condition.

In operation, the implement 22 can be transported to a field in the transport configuration by a user operating a powered tractor. At the field, the implement 22 can be shifted from the transport configuration to the planting configuration by swinging the wing sections 52 from the folded position to the unfolded position. Also, the foldable markers 20 are both swingable from the folded arm condition to the unfolded arm condition. This unfolding of the markers 20 can occur before, during, or after the illustrated implement 22 is shifted from the transport configuration to the planting configuration. Again, it is within the scope of the present invention where only one of the foldable markers 20 is moved from the folded arm condition to the unfolded arm condition for planting and/or fertilizer application. Furthermore, for some planting, application, or other operating situations, both foldable markers 20 may remain folded while the wing sections 52 are unfolded.

When the operator is ready to transport the implement 22 again, the implement 22 is returned from the planting configuration to the transport configuration by swinging the wing sections 52 from the unfolded position to the folded position. Also, the foldable markers 20 can be swingably returned from the unfolded arm condition to the folded arm condition. Folding of the markers 20 can occur before, during, or after the implement 22 is shifted from the planting configuration to the transport configuration. Again, in some situations where the implement 22 is ready to be returned to the transport configuration, one or both of the foldable markers may already be in the folded arm condition.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A foldable marker mounted on a wing section of an agricultural implement, the foldable marker comprising:
    an elongate inboard arm, the inboard arm defining a longitudinal axis along its length and a transverse axis that is orthogonal to the longitudinal axis, the inboard arm having an inner tab fixed near one end of the inboard arm and at least one stop fixed near an opposite end of the inboard arm;
    an outboard arm, the outboard arm having a slotted plate with an elongated slot formed in the slotted plate;
    a linkage assembly connecting the inboard and outboard arms to form an outer pivot joint so that the marker can be shifted between a folded and an unfolded arm condition, the linkage assembly comprising at least one base link having an upper end and a lower end, the lower end being pivotally attached to the inboard arm, and at least one sliding link having an inboard end and outboard end, the inboard end of the sliding link being pivotally attached with the upper end of the base link, and the outboard end of the sliding link being slidably mounted with the slot of the slotted plate such that movement of the outboard end of sliding link with respect to the outboard arm is constrained to movement along the slot;
    a support frame mounted at an outboard end of the wing section, the support frame including a lower stop, a pair of upper tabs, and a support bracket, the support bracket attached to the inboard arm to form an inner pivot joint, wherein the support frame is attached to the wing section so that the longitudinal axis is substantially parallel to a longitudinal axis of the wing section when the marker is unfolded and the longitudinal axis is substantially coaxially aligned with a longitudinal axis of the wing section along the fore-and-aft direction of the implement when the marker is unfolded;

a hydraulic cylinder assembly comprising a movable piston to drive the arms between the folded and unfolded arm conditions, wherein one end of the cylinder assembly is attached to the upper tabs of the support frame and an opposite end is attached to the upper end of the base link and the inboard end of the sliding link such that the base link and sliding link move with the piston, wherein the marker is shiftable from the unfolded arm condition to the folded arm condition by shifting the cylinder assembly from an extended position to a retracted position such that piston retraction causes the sliding link to slide in the slot of the slotted plate until the sliding link reaches an upper end of the slot and further piston retraction causes pivoting of the outboard arm relative to the inboard arm until the base link engages the stop on the inboard arm, and piston retraction also causes pivoting of the inboard arm relative to the support frame until the inboard arm is in an upright position, and the foldable marker is shiftable from the folded arm condition to the unfolded arm condition by shifting the cylinder assembly from the retracted position to the extended position such that the arms pivot downwardly relative to the support frame and the inboard arm pivots downwardly until the inboard arm is generally horizontal and the tab engages the lower stop to restrict further downward movement of the inboard arm; and a coulter disc supported by the arms and constructed so that the coulter disc engages the ground leaving a visible demarcation in the field as the marker is moved as part of the implement when in the unfolded arm condition.

2. The foldable marker of claim 1 wherein the inboard arm includes a tubular body, an arm pivot bracket integrally fixed to an inboard end of the body, and a sleeve integrally fixed to an outboard end of the body.

3. The foldable marker of claim 1 wherein the inner pivot joint defines a pivot axis AP, the pivot axis AP and the transverse axis AT defining an angle having a lateral component and a vertical component.

4. The foldable marker of claim 1 wherein the outboard arm includes telescopic inboard and outboard arm sections.

5. The foldable marker of claim 1 wherein the base link and sliding link are pivotably connected with a link pin.

6. The foldable marker of claim 1 wherein the lower end of the base link is pivotally attached an outer tab of the inboard arm to form a third pivot joint.

7. The foldable marker of claim 1 wherein when in the folded arm condition, the inboard arm projects upwardly and in the outboard direction from the inner pivot joint and the outboard arm projects generally rearwardly from the outer pivot joint.

8. The foldable marker of claim 1 wherein the slotted plate comprises an elongated base that extends generally along an axis of the outboard arm and the slotted plate also includes a curved projection that is fixed to and projects from a location between ends of the base both upwardly and in an inboard direction when the inboard and outboard arms are unfolded, wherein the projection presents the elongated slot that extends from a slot end adjacent the base and extends generally upwardly and along the inboard direction to the upper slot end.

* * * * *